Dec. 5, 1939.   C. E. KIRK   2,182,258
REPAIR CLAMP
Filed July 26, 1937
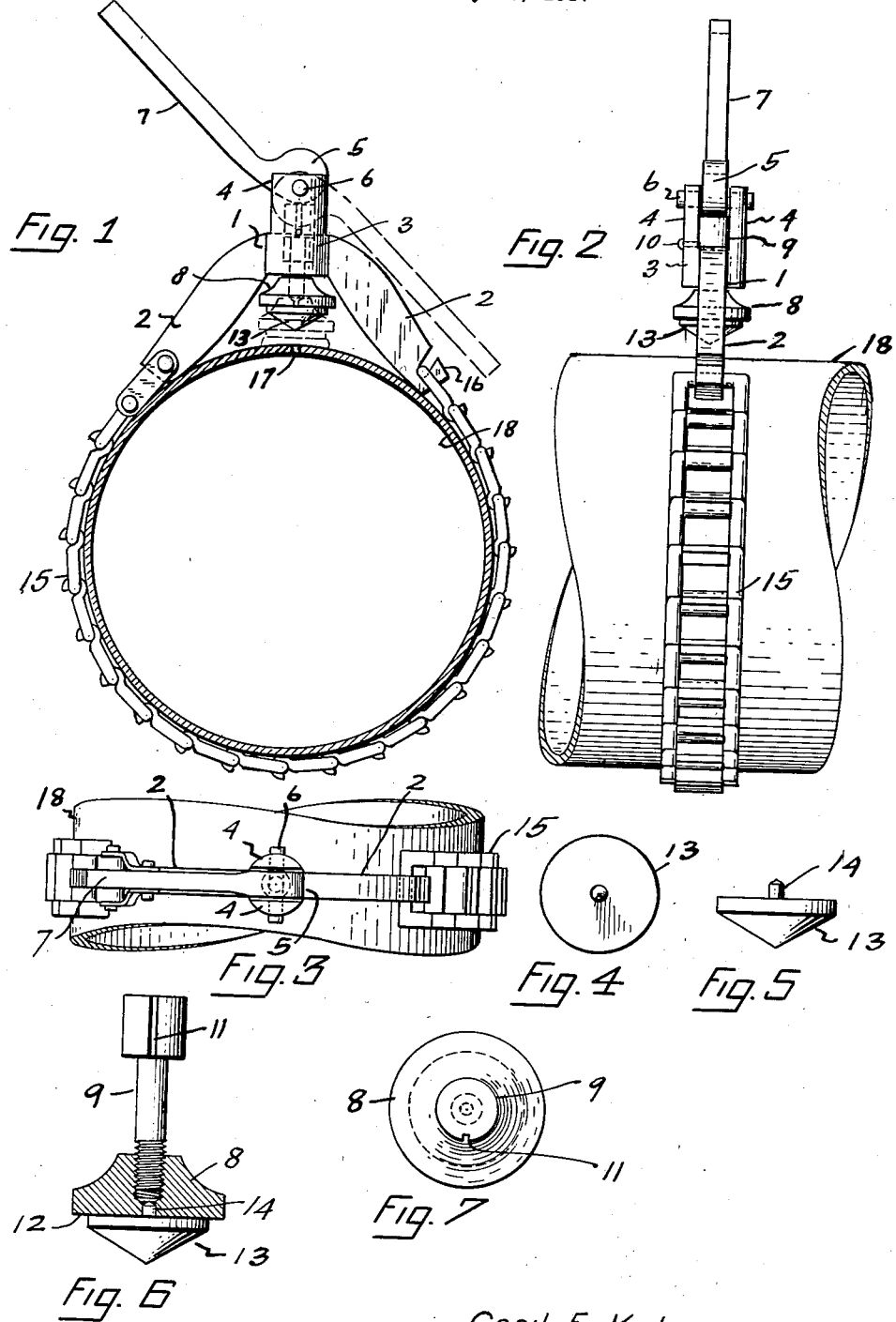
Cecil E. Kirk   INVENTOR.
BY Edward V. Hardeway
ATTORNEY.

Patented Dec. 5, 1939

2,182,258

UNITED STATES PATENT OFFICE 2,182,258

REPAIR CLAMP

Cecil E. Kirk, Edna, Tex.

Application July 26, 1937, Serial No. 155,698

1 Claim. (Cl. 138—99)

This invention relates to a repair clamp.

An object of the invention is to provide means for temporarily closing a leak that may develop in a pipe.

The invention is primarily intended for use on pipes for conducting fluid under high pressure, although it is adapted for general use on fluid conducting pipes of any character for closing a leak that may develop therein.

Another object of the invention is to provide a repair clamp of the character described embodying a yoke, means for detachably securing the yoke to the pipe, a resilient closure and means on the yoke for actuating the resilient closure into position about the opening, or leak, through the pipe and for releasing the same when it may be desired to remove the clamp from the pipe.

It is a further object of the invention to provide means for conveniently locking the closure in active position.

A still further feature of the invention resides in the provision of a repair clamp that is of simple construction and may be readily and quickly applied in case of emergency and as readily removed when it may be desired to permanently repair the leak.

With the above and other objects in view, the invention has particular relation to certain novel features of construction, arrangement of parts and use, an example of which is given in this specification and illustrated in the accompanying drawing, wherein:

Figure 1 shows a side elevation of the clamp as applied to the pipe.

Figure 2 shows an edge view.

Figure 3 shows a plan view.

Figure 4 shows a plan view of the resilient closure.

Figure 5 shows a side view thereof.

Figure 6 shows a side view partly in section of the closure as mounted on the plunger, and Figure 7 shows a top plan view of the plunger.

Referring now more particularly to the drawing, wherein like numerals of reference designate the same parts in each of the figures, the numeral 1 designates a yoke having the diverging legs 2. The upper ends of these legs are integrally joined to a cylindrical bearing member 3 whose upper end is bifurcated forming the ears 4, 4 between which the cam 5 is located. This cam is mounted to pivot on the cross pin 6 which extends through said ears and the cam is provided with an operating handle 7. There is a plunger comprising the head 8 and the stem 9 with which the head has a threaded connection. The stem works through the bearing member 3 and its outer end is enlarged and fitted between the ears 4. It is maintained against turning by means of the key 10 whose inner end projects into longitudinal groove 11 of the outer enlarged end of the stem 9. The outer end of the head 8 presents a flat face 12. There is a resilient closure member 13 preferably formed of rubber and fitted closely against the face 12. It may be retained in place in any preferred manner, as by means of a stud 14 fitted into a central opening in the head. The outer end of the closure member, as shown, is conical although it may be of any shape, depending on the nature of the leak to be closed.

The yoke may be secured in operative position on the pipe in any preferred manner, preferably by means of a flexible chain 15 one end of which is permanently attached to one of the legs 2 and the other end of which may be engaged with a hook 16 into which the other leg 2 is formed, as illustrated in Figure 1. In applying the clamp to the pipe, it should be positioned to locate the closure member 13 opposite the opening 17 to be closed and the cam 5 should be retracted as shown in full lines in Figure 1, so as to present its low side to the outer end of the plunger stem 9, the handle 7 may then be swung around into position shown in dotted lines in Figure 1, the cam 5 operating against the plunger stem 9 to force the closure member 13 firmly against the pipe 18 around the leak opening 17. When the handle 7 is swung to the position shown in dotted lines in Figure 1, the high face of the cam will slightly pass center so that the cam will be maintained in active position to maintain the closure member firmly against the pipe around the leak opening 17 and leakage through said opening will thus be effectively prevented.

In order to remove the clamp the handle 7 may be swung back to the position indicated in full lines in Figure 1 and the end link of the chain 15 then readily removed from the hook 16.

The drawing and description disclose what is now considered to be a preferred form of the invention, by way of illustration only, while the broad principle of the invention will be defined by the appended claim.

What I claim is:

A repair clamp comprising a yoke having diverging legs forming supports to rest on a pipe, a cylindrical bearing member joining the outer ends of the legs whose outer end is provided with spaced ears, a cam pivoted between said ears, a handle for the cam, a plunger comprising an inner head and an outer stem, said stem working through a bearing in said bearing member and having its outer end enlarged and fitted between the ears, means for preventing the stem from turning in the bearing, means adapted to surround a pipe for securing the yoke to the pipe, a resilient closure member carried by the head, the cam being operative against the enlarged outer end of the stem to actuate the plunger to move the closure member into close fitting contact with the pipe around a leak in the pipe to be closed.

CECIL E. KIRK.